(12) United States Patent
Guo

(10) Patent No.: US 8,696,774 B2
(45) Date of Patent: Apr. 15, 2014

(54) GASIFICATION SYSTEM AND METHOD USING FUEL INJECTORS

(75) Inventor: Cliff Yi Guo, Sugar Land, TX (US)

(73) Assignee: General Electric Company, Schenectady, NY (US)

(*) Notice: Subject to any disclaimer, the term of this patent is extended or adjusted under 35 U.S.C. 154(b) by 825 days.

(21) Appl. No.: 12/684,000

(22) Filed: Jan. 7, 2010

(65) Prior Publication Data

US 2011/0162376 A1   Jul. 7, 2011

(51) Int. Cl.
  *C10J 1/207*  (2012.01)
(52) U.S. Cl.
  USPC ......... 48/76; 48/61; 48/77; 48/127.9; 48/202; 48/127.1; 48/200
(58) Field of Classification Search
  USPC ........................................ 48/61, 76, 77, 127.9
  See application file for complete search history.

(56) References Cited

U.S. PATENT DOCUMENTS

| | | | |
|---|---|---|---|
| 3,844,733 A | 10/1974 | Donath | |
| 4,872,886 A | 10/1989 | Henley et al. | |
| 5,653,916 A | 8/1997 | Disselhorst et al. | |
| 6,206,949 B1 * | 3/2001 | Kobayashi et al. | 75/460 |
| 7,793,601 B2 | 9/2010 | Davison et al. | |
| 7,862,632 B2 | 1/2011 | Yu et al. | |
| 7,959,829 B2 | 6/2011 | Breton et al. | |
| 8,486,168 B2 | 7/2013 | Dogru et al. | |
| 2007/0006528 A1 | 1/2007 | Diebold | |
| 2007/0294943 A1 | 12/2007 | Van Den Berg et al. | |
| 2008/0073445 A1 | 3/2008 | Yu et al. | |
| 2008/0134578 A1 | 6/2008 | Yu et al. | |
| 2008/0141588 A1 | 6/2008 | Kirchhubel et al. | |
| 2010/0251614 A1 | 10/2010 | Ji | |
| 2011/0168947 A1 | 7/2011 | Ji et al. | |
| 2011/0182778 A1 | 7/2011 | Breton et al. | |

FOREIGN PATENT DOCUMENTS

| | | |
|---|---|---|
| CA | 2527662 A2 | 5/2006 |
| CN | 1954055 | 4/2007 |
| DE | 3617773 A1 | 12/1986 |
| EP | 0050863 A1 | 5/1982 |
| EP | 2199375 A2 | 6/2010 |
| GB | 2082624 A | 3/1982 |
| GB | 2138841 A | 10/1984 |
| WO | 02/46331 A1 | 6/2002 |
| WO | 02/48292 A1 | 6/2002 |
| WO | 2005/047435 A2 | 5/2005 |
| WO | 2006/056053 A1 | 6/2006 |
| WO | 2009/081282 A2 | 7/2009 |
| WO | 2009081282 A2 | 7/2009 |

OTHER PUBLICATIONS

Wang, Fu-Chen, et al.; "Process Analysis and Simulation of Shell Pulverized Coal Gasifier"; Journal of East China University of Science and Technology, vol. 29, No. 2, Apr. 2003, pp. 202-205.

(Continued)

*Primary Examiner* — Kaity V. Handal
(74) *Attorney, Agent, or Firm* — Fletcher Yoder, P.C.

(57) ABSTRACT

A system is provided that comprises a gasifier with an enclosure disposed about a chamber, wherein the enclosure comprises a top wall, a bottom wall, and a side wall between the top and bottom walls. The gasifier also comprises an outlet disposed in the bottom wall, a first injector disposed in the top wall, and a second injector disposed in the side wall, wherein the first and second injectors are configured to inject fuel, oxygen, or a combination thereof, into the chamber.

16 Claims, 4 Drawing Sheets

(56) References Cited

OTHER PUBLICATIONS

PCT Invitation to pay additional fees issued in connection with corresponding WO Patent Application No. US11/20356 filed on Jan. 6, 2011.

PCT Search Report issued in connection with corresponding WO Patent Application No. US2011/020356 filed on Jan. 6, 2011.

Xu, Shoo-Ze et al.; "Stochastic model of residence time distribution in opposed tetra-burner gasifier"; Journal of Fuel Chemistry and Technology, vol. 34, No. 1, Feb. 2006, pp. 30-35.

U.S. Appl. No. 13/603,368, filed Sep. 4, 2012, Sethuraman Balasubramaniyan.

CN100035 (201180012952.X) Office Action dated Jul. 18, 2013.

* cited by examiner

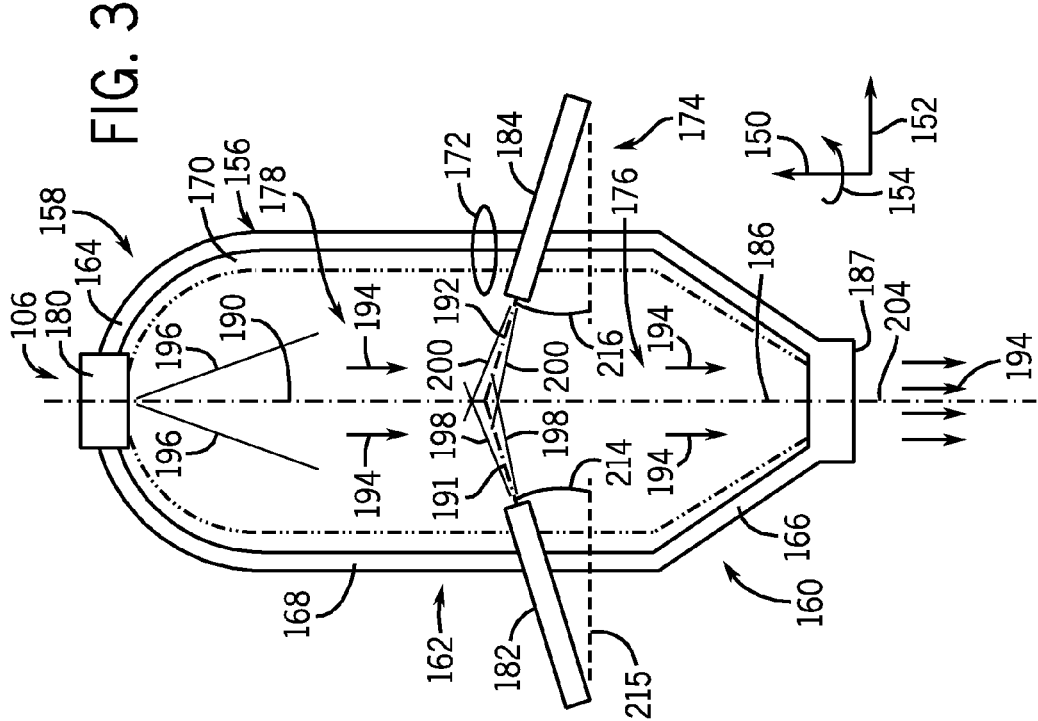

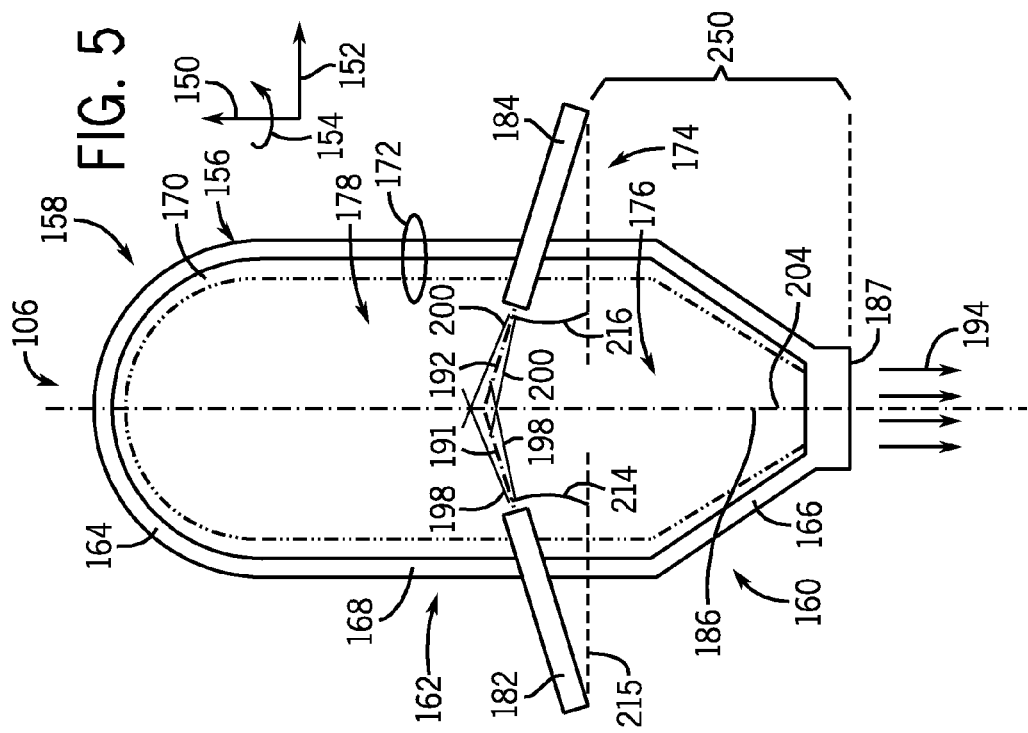
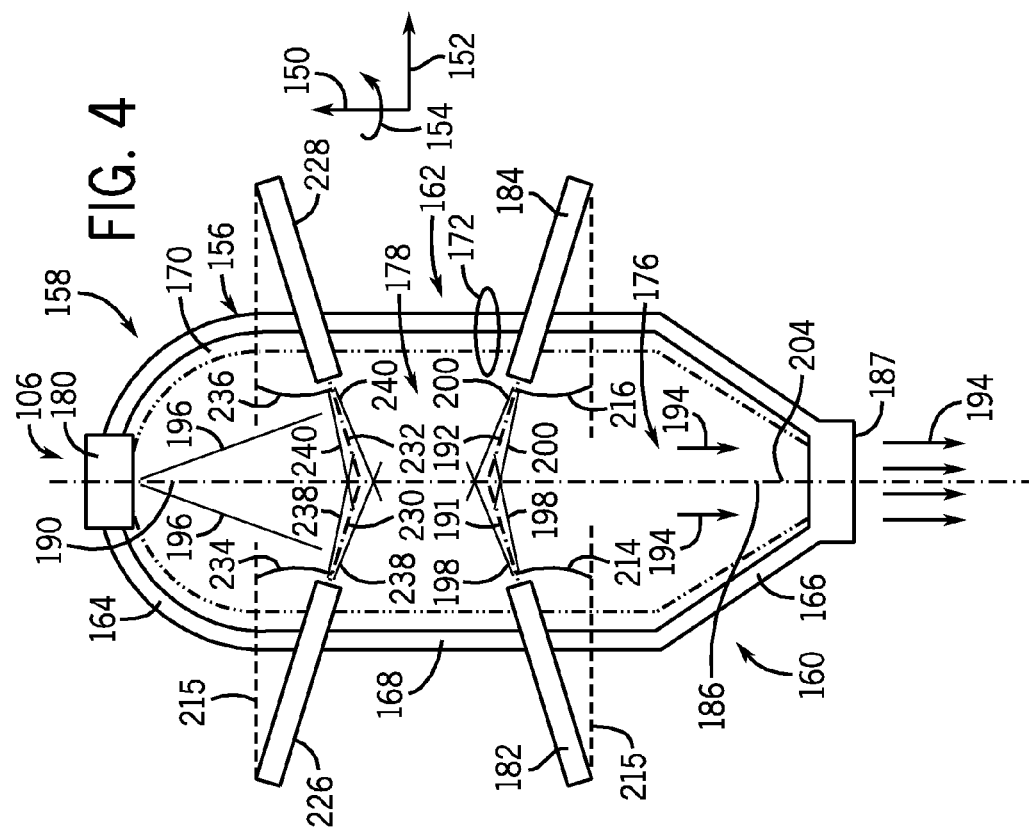

GASIFICATION SYSTEM AND METHOD USING FUEL INJECTORS

BACKGROUND OF THE INVENTION

The subject matter disclosed herein relates to feedstock gasification and, more particularly, feedstock injection into a gasifier.

Integrated gasification combined cycle (IGCC) power plants are capable of generating energy from various hydrocarbon feedstock, such as coal, relatively cleanly and efficiently. IGCC technology may convert the hydrocarbon feedstock into a gas mixture of carbon monoxide (CO) and hydrogen ($H_2$), i.e., syngas, by reaction with steam in a gasifier. The degree of mixing, residence time, and uniformity of flow through an interior chamber of the gasifier often affects the gasification performance (e.g., carbon conversion efficiency and coal handling capacity). Unfortunately, conventional gasifiers often exhibit poor mixing, residence times, and/or uniformity of flow, which leads to poor performance of the gasifier and the entire IGCC power plant.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasifier that includes an enclosure disposed about a chamber, wherein the enclosure comprises a top wall, a bottom wall, and a side wall between the top and bottom walls. The gasifier also includes an outlet disposed in the bottom wall, a first injector disposed in the top wall, and a second injector disposed in the side wall, wherein the first and second injectors are configured to inject fuel, oxygen, or a combination thereof, into the chamber.

In a second embodiment, a system includes a gasifier that includes an enclosure disposed about a gasification chamber and an outlet coupled to the enclosure, wherein the outlet comprises an outlet axis for exhaust in a downstream direction. The gasifier also includes a first injector coupled to the enclosure, wherein the first injector comprises a first injection axis for injection of fluid into the gasification chamber, the first injection axis is not perpendicular to the outlet axis, the first injector is oriented in an upstream direction away from the outlet, and the fluid comprises fuel, oxygen, or a combination thereof.

In a third embodiment, a system includes a gasifier that includes an elongated enclosure having a first end portion, a second end portion opposite from the first end portion, and an intermediate portion between the first and second end portions. A first injector is coupled to the first end portion, a second injector is coupled to the intermediate portion, and an outlet is coupled to the second end portion. The outlet is longitudinally offset from the first injector by a first distance, the second injector is longitudinally offset from the first injector by a second distance, and the second distance is approximately 50 to approximately 75 percent of the first distance.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is a cross-sectional side view of an embodiment of the gasifier of FIG. 1 including a top injector and two side injectors;

FIG. 3 is a cross-sectional side view of an embodiment of the gasifier of FIG. 2 including tilted side injectors;

FIG. 4 is a cross-sectional side view of an embodiment of the gasifier of FIG. 3 including additional tilted side injectors;

FIG. 5 is a cross-sectional side view of an embodiment of the gasifier of FIG. 1 including tilted side injectors.

DETAILED DESCRIPTION OF THE INVENTION

Figure 1:
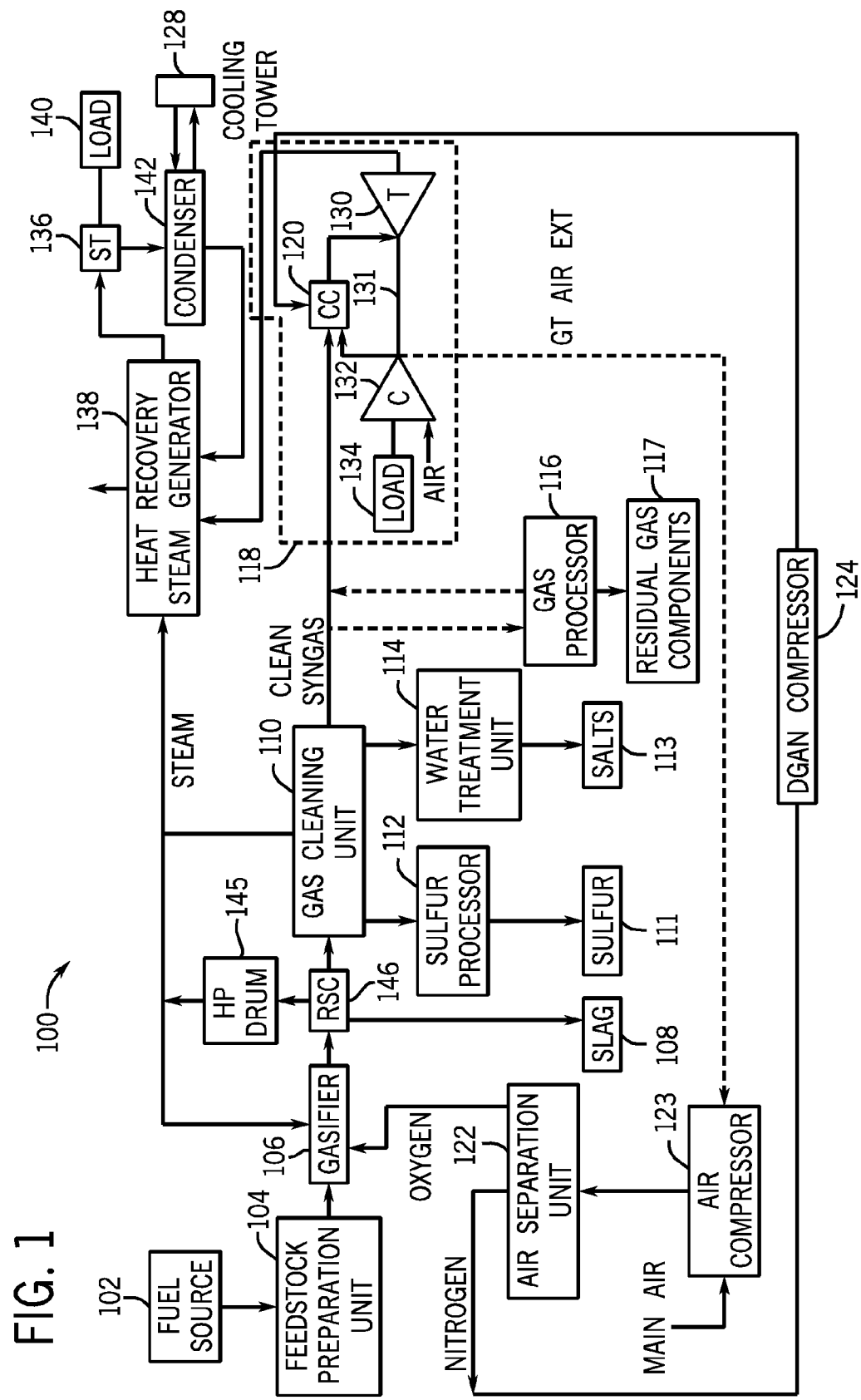
FIG. 1 is a schematic block diagram of an embodiment of an integrated gasification combined cycle (IGCC) power plant having a gasifier with uniquely configured fuel injectors.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements.

As described below, the disclosed embodiments may include a multi-injector gasifier having one or more uniquely oriented injectors configured to inject fuel, oxygen, or a combination thereof, into a gasification chamber. The unique orientation of the injectors of the disclosed embodiment is configured to increase the mixing, residence time, and uniformity of flow throughout the gasification chamber, thereby increasing the performance (e.g., carbon conversion and coal handling capacity) of the gasifier. For example, the unique orientation of the injectors may be configured to provide crosswise flows and/or opposing flows to increase turbulence in the gasification chamber. In certain embodiments, the injectors may be disposed in a variety of locations along a perimeter (e.g., wall) of an enclosure that defines the gasification chamber. For example, the injectors may inject flow in directions crosswise and/or parallel with a downstream flow direction toward an outlet of the gasifier. The crosswise flow may be angled upstream and/or downstream relative to the downstream flow direction. For example, the crosswise flow may be angled greater than 0 and less than 90 degrees relative to the downstream flow direction.

In certain embodiments, the gasifier may include one or more injectors at different axial, radial, and/or circumferential positions upstream from the outlet of the gasifier. For example, the enclosure may have a first set of injectors at a first upstream position relative to the outlet (e.g., upper portion of the enclosure), a second set of injectors at a second upstream position relative to the outlet (e.g., intermediate portion of the enclosure), a third set of injectors at a third upstream position relative to the outlet (e.g., lower portion of the enclosure), and so forth. Each set of injectors may include one or more injectors (e.g., fuel and/or oxygen injectors) at different circumferential positions and with different injection angles. For example, a plurality of injectors in each set may be circumferentially spaced about a sidewall of the enclosure (e.g., equal or unequal spacing). In certain embodiments, the angles may be defined between injection axes of the injectors and a plane perpendicular to the downstream flow direction toward the outlet (e.g., a plane perpendicular to an outlet axis).

For example, the first set of injectors may be configured to inject flow along first injection axes at first angles relative to the plane. In one embodiment, the first angles are perpendicular to the plane (i.e., 90 degrees), and are directed in downstream directions along the downstream flow direction toward the outlet. However, the first angles may range between approximately 45 to 90, 60 to 90, 70 to 90, or 80 to 90 degrees. The second set of injectors may be configured to inject flow along second injection axes at second angles relative to the plane. In one embodiment, the second angles are greater than 0 and less than 90 degrees, and are directed away from the outlet in upstream directions against the downstream flow direction. In another embodiment, the second angles are greater than 0 and less than 90 degrees, and are directed toward the outlet in downstream directions along the downstream flow direction. In either embodiment, the second angles may be approximately 5 to 85, 10 to 80, 20 to 70, 30 to 60, 40 to 50, 15 to 60, 15 to 45, or 20 to 40 degrees in upstream and/or downstream directions. The third set of injectors may be configured to inject flow along third injection axes at third angles relative to the plane. In one embodiment, the third angles are greater than 0 and less than 90 degrees, and are directed away from the outlet in upstream directions against the downstream flow direction. In another embodiment, the third angles are greater than 0 and less than 90 degrees, and are directed toward the outlet in downstream directions along the downstream flow direction. In either embodiment, the third angles may be approximately 5 to 85, 10 to 80, 20 to 70, 30 to 60, 40 to 50, 15 to 60, to 45, or 20 to 40 degrees in upstream and/or downstream directions. In certain embodiments, the second and third angles are both directed upstream, both directed downstream, or directed opposite from one another (i.e., opposing upstream and downstream). However, any suitable number and arrangement of injectors may be employed in the disclosed embodiments.

The multi-injector gasifier illustrated and described herein is configured for resultant syngas to be exhausted from the gasifier via an outlet disposed in a bottom portion of the gasifier. However, the disclosed embodiments may be used with a variety of other types of gasifiers wherein the outlet is not disposed in a bottom wall. Specifically, the disclosed embodiments may be used in conjunction with entrained flow gasifiers in which the direction of flow through the gasification chamber may be upward through the gasifier. In these systems, the resultant syngas may exit an outlet located on or near the top wall of the gasifier, while molten slag may exit through the bottom wall. The disclosed embodiments may also be employed in fluidized bed gasifiers. Likewise, the outlet in such devices may be located near the top wall of the gasifier, since the direction of flow is generally upward.

Turning now to the drawings, FIG. 1 is a diagram of an embodiment of an integrated gasification combined cycle (IGCC) system 100 that may be powered by synthetic gas, i.e., syngas. Elements of the IGCC system 100 may include a fuel source 102, such as a solid feed, that may be utilized as a source of energy for the IGCC. The fuel source 102 may include coal, petroleum coke, biomass, wood-based materials, agricultural wastes, tars, coke oven gas and asphalt, or other carbon containing items.

The solid fuel of the fuel source 102 may be passed to a feedstock preparation unit 104. The feedstock preparation unit 104 may, for example, resize or reshape the fuel source 102 by chopping, milling, shredding, pulverizing, briquetting, or palletizing the fuel source 102 to generate feedstock. Additionally, water, or other suitable liquids may be added to the fuel source 102 in the feedstock preparation unit 104 to create slurry feedstock. In other embodiments, no liquid is added to the fuel source, thus yielding dry feedstock.

The feedstock may be passed to a gasifier 106 from the feedstock preparation unit 104. As discussed in detail below, certain embodiments of the gasifier include a plurality of injectors (e.g., oxygen and fuel) oriented crosswise (e.g., angled upstream and downstream) relative to a downstream flow direction toward an outlet of the gasifier. The gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 to 85 bar, and temperatures, e.g., approximately 700 to 1600 degrees Celsius, depending on the type of gasifier 106 utilized. The gasification process may include the feedstock undergoing a pyrolysis process, whereby the feedstock is heated. Temperatures inside the gasifier 106 may range from approximately 150 to 700 degrees Celsius during the pyrolysis process, depending on the fuel source 102 utilized to generate the feedstock. The heating of the feedstock during the pyrolysis process may generate a solid, (e.g., char), and residue gases, (e.g., carbon monoxide, hydrogen, and nitrogen). The char remaining from the feedstock from the pyrolysis process may only weigh up to approximately 30% of the weight of the original feedstock.

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700 to 1600 degrees Celsius. Next, steam may be introduced into the gasifier 106 during a gasification step. The char may react with the carbon dioxide and steam to produce carbon monoxide and hydrogen at temperatures ranging from approximately 800 degrees Celsius to 1100 degrees Celsius. In essence, the gasifier utilizes steam and oxygen to allow some of the feedstock to be "burned" to produce carbon monoxide and energy, which drives a second reaction that converts further feedstock to hydrogen and additional carbon dioxide.

In this way, a resultant gas is manufactured by the gasifier 106. This resultant gas may include approximately 85% of carbon monoxide and hydrogen, as well as $CH_4$, HCl, HF, COS, $NH_3$, HCN, and $H_2S$ (based on the sulfur content of the feedstock). This resultant gas may be termed dirty syngas. The gasifier 106 may also generate waste, such as slag 108, which may be a wet ash material. This slag 108 may be removed from the gasifier 106 and disposed of, for example, as road base or as another building material. To clean the dirty syngas, a gas cleaning unit 110 may be utilized. The gas cleaning unit 110 may scrub the dirty syngas to remove the HCl, HF, COS, HCN, and $H_2S$ from the dirty syngas, which may include separation of sulfur 111 in a sulfur processor 112 by, for example, an acid gas removal process in the sulfur processor 112. Furthermore, the gas cleaning unit 110 may separate salts 113 from the dirty syngas via a water treatment unit 114 that may utilize water purification techniques to generate usable salts 113 from the dirty syngas. Subsequently, the gas from the gas cleaning unit 110 may include clean syngas, e.g., $NH_3$ (ammonia) and $CH_4$ (methane).

A gas processor 116 may be utilized to remove residual gas components 117 from the clean syngas such as, ammonia and methane, as well as methanol or any residual chemicals. However, removal of residual gas components 117 from the clean syngas is optional, since the clean syngas may be utilized as a fuel even when containing the residual gas components 117, e.g., tail gas. At this point, the clean syngas may include approximately 3% CO, approximately 55% $H_2$, and approximately 40% $CO_2$ and is substantially stripped of $H_2S$. This clean syngas may be transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases may force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

FIG. 2 is a cross-sectional side view of an embodiment of the gasifier 106 for use with the IGCC system 100 of FIG. 1. The gasifier 106 may have an axial axis or direction 150, a radial axis or direction 152, and a circumferential axis or direction 154. The gasifier 106 includes an enclosure 156 that functions as a housing or outer casing for the gasifier 106. The enclosure 156 includes a first end portion 158 and a second end portion 160. An intermediate portion 162 is defined by the section of the enclosure 156 that lies axially between the first end portion 158 and the second end portion 160. The first end portion 158 and the second end portion 160 include a dome-shaped top wall 164, and a triangular-shaped (e.g., conical shaped) bottom wall 166, respectively. A side wall 168 (e.g., annular side wall) parallel to the axial axis 150 is disposed in the intermediate portion 162 between the top wall 164 and the bottom wall 166.

The illustrated embodiment also includes a thermal barrier 170 concentrically disposed inside the enclosure 156. The thermal barrier 170 and the enclosure 156 form a wall assembly 172 that separates an exterior 174 of the gasifier 106 from an interior 176 of the gasifier 106. The interior 176 includes a gasification chamber 178 where pyrolysis, combustion, gasification, or a combination thereof, may occur as previously described with respect to FIG. 1. The wall assembly 172 is configured to block heat transfer and leakage of gaseous components from the interior 176 to the exterior 174 during gasification. Additionally, the thermal barrier 170 may be configured to maintain the surface temperature of the enclosure 156 within a desired temperature range. Accordingly, the thermal barrier 170 may include passive shielding, active cooling, or a combination thereof. For example, in embodiments where the thermal barrier 170 is a passive thermal shield, it may be made of a variety of refractory materials capable of withstanding temperatures up to or greater than approximately 500° C., 1000° C., 1500° C., or even 2000° C. That is, the thermal barrier 170 may be made of any material that maintains its predetermined physical and chemical characteristics upon exposure to such high temperatures. Suitable refractory materials for use as the thermal barrier 170 may include ceramics (e.g., clay or minerals), metals (e.g., titanium, tungsten), cermets (i.e., ceramic and metal composites), or other refractory materials (e.g., silica, aluminum oxide). For further example, certain embodiments may employ an active thermal cooling system as a component of the thermal barrier 170. In such embodiments, cooling tubes may be used for temperature reduction purposes. That is, a coolant (e.g., chilled water) may be circulated through one or more tubes to lower the surface temperature of the enclosure 156.

In certain embodiments, the gasifier 106 may include a plurality of injectors disposed about the gasification chamber 178. The injectors may be configured to inject fuel, oxygen (e.g., air), or a mixture of fuel and oxygen into the gasification chamber 178. For instance, the injectors may inject fuel in the form of carbonaceous material, such as coal, petroleum, or biomass. In fact, the injectors may inject any material suitable for the production of syngas via gasification (e.g., organic materials, such as wood or plastic waste). For further example, the injectors may inject a controlled amount of oxygen and/or steam either alone or in combination with a suitable fuel. Depending on the application, the gasifier 106 may include between approximately 1 and 100 of such injectors disposed about the gasification chamber 178. It should be noted that any suitable number or arrangement of the plurality of injectors may be employed in the gasifier 106 in accordance with embodiments of the present invention.

In certain embodiments, the gasifier 106 may include one or more injectors at different axial, radial, and/or circumferential positions relative to axes 150, 152, and 154. In the embodiment illustrated in FIG. 2, a first injector 180 (or first set of multiple injectors) is disposed in the top wall 164 of the first end portion 158 of the enclosure 156. A second injector 182 and a third injector 184 (or second set of multiple injectors) are disposed diametrically opposite one another in the side wall 168 of the intermediate portion 162 of the enclosure 156. That is, the second injector 182 and the third injector 184 are located an equivalent radial distance from the first injector 180, but are disposed on opposite sides of a longitudinal axis 186 of the gasifier 106. The first injector 180 is longitudinally offset from an outlet 187 by a first distance 188. The second injector 182 is longitudinally offset from the first injector 180 by a second distance 189. In some embodiments, the second distance 189 may be approximately 25 to 75, 25 to 50, or 50 to 75 percent of the first distance 188 (e.g., approximately 25, 30, 35, 40, 45, 50, 55, 60, 65, 70, or 75 percent of the first distance). Likewise, the third injector 184 may also be longitudinally offset from the first injector 180 by distance 189.

In the embodiment illustrated in FIG. 2, the two injectors 182 and 184 are disposed on the side wall 168 of the gasifier 106. However, in further embodiments, any number of injectors may be spaced apart from one another and disposed circumferentially (e.g., in the circumferential direction 154) about a perimeter of the side wall 168 of the gasifier 106. In such embodiments, the injectors may be equally spaced circumferentially about the perimeter (e.g., 1 injector approximately every 10, 20, 30, 40, or 50 degrees) or unequally spaced about the perimeter. As previously mentioned, the injectors 180, 182, 184 are configured to inject fuel, oxygen (e.g., air), or a combination thereof, into the gasification chamber 178. Accordingly, the first injector 180 includes a first injection axis 190 that determines the general orientation of the flow originating from the first injector 180. Likewise, the second injector 182 and the third injector 184 include a second injection axis 191 and a third injection axis 192 that determine the orientations of the flows originating from the second injector 182 and the third injector 184, respectively.

In the illustrated embodiment, the first injection axis 190 is parallel to the axial axis 150 and perpendicular to the radial axis 152 of the gasifier 106. In other words, the first injection axis 190 is parallel to the longitudinal axis 186. Such a feature has the effect of directing a fluid flow emerging from the first injector 180 in a generally downward direction (e.g., downstream flow direction), as indicated by arrows 194, through the gasification chamber 178 during use. In certain embodiments, the first injection axis 190 may be directed away from the longitudinal axis 186 by an angle between approximately 0 to 45, 0 to 30, 0 to 20, or 0 to 10 degrees. Furthermore, certain embodiments of the first injector 180 may provide a divergent spray, e.g., fluid flow originating from the first injector 180 may diverge outward toward the side walls 168 in a generally downward direction (e.g., downstream flow direction), as indicated by reference numeral 196.

The second injection axis 191 in the embodiment of FIG. 2 is parallel to the radial axis 152 and perpendicular to the axial axis 150 of the gasifier 106. This feature has the effect of directing a fluid flow emerging from the second injector 182 in a generally lateral direction into the gasification chamber 178 during use. However, fluid flow originating from the second injector 182 may also diverge outward toward the top wall 164 and the bottom wall 166 as indicated by reference numeral 198. Similarly, the third injection axis 192 is also parallel to the radial axis 152 and perpendicular to the axial axis 150 of the gasifier 106. Therefore, as before, fluid flow from the third injector 184 is directed in a generally lateral direction into the gasification chamber 178, but fluid may also flow along paths indicated by reference numeral 200. Furthermore, since the second injector 182 and the third injector 184 are oriented generally toward one another, the flow path from the second injector 182 and the flow path from the third injector 184 are directed in generally converging directions along the radial axis 152 of the gasifier 106. In other words, the second and third injectors 182 and 184 are oriented to provide opposing flows that converge toward one another (e.g., toward the axis 186) at a different axial position than the first injector 180.

During operation, the injectors 180, 182, 184 inject fuel and oxygen (e.g., air) into the gasification chamber 178. For example, the first injector 180 may inject oxygen (e.g., air) while second and third injectors 182 and 184 inject fuel, or vice versa. By further example, all three injectors 180, 182, and 184 may inject a fuel/oxygen mixture of equal or different ratios. After injection, the gasifier 106 utilizes steam and oxygen to allow some of the fuel to be burned to produce carbon monoxide and energy. This drives a second reaction that converts further fuel to hydrogen and additional carbon dioxide. The conversion efficiency and mixing effectiveness of such reactions may be optimized by the embodiments disclosed herein. For instance, turbulence is generated when fluid flow from injector 180 meets and mixes with the fluid flow from injectors 182 and 184 as the fluid moves downstream toward outlet 187. The foregoing features may also have the effect of increasing residence time as compared to traditional systems. Additionally, the inclusion of multiple injectors in the gasifier 106 may offer distinct advantages over single injector gasification systems. For instance, multiple injectors may allow for an increase in the coal handling capacity of the gasifier 106, thereby generating a greater amount of useful product than traditional systems. Such an increase may be possible because with each injector being capable of handling approximately 1000 tons of coal daily, the gasifier 106 may be able to handle at least approximately 3000, 4000, 5000, or more tons of coal daily. For example, the gasifier 106 illustrated in FIG. 2 may be able to handle approximately 3000 tons of coal daily since it has three injectors. The increase in turbulence and, therefore, improved mixing may allow the gasifier 106 to handle this increase in fuel while maintaining optimal carbon conversion performance.

In the embodiments of the gasifier 106 illustrated and described herein, the resultant syngas emerges from the gasifier 106 via outlet 187 along a path generally defined by outlet axis 204. That is, the syngas exits the gasifier 106 via a location in the bottom wall 166 of the gasifier 106. However, it should be noted that the multi-injector gasifier design disclosed herein may be used with a variety of other gasification systems wherein the outlet is not disposed in a bottom wall. For instance, the disclosed embodiments may be used in conjunction with entrained flow gasifiers. In such embodiments, the direction of flow through the gasification chamber 178 may be upward through the gasifier 106, i.e., in a direction opposite arrows 194. In these systems, the resultant syngas may exit an outlet located on or near the top wall 164 of the gasifier 106, while the molten slag may exit through the bottom wall 166. For further example, the disclosed embodiments may be employed in fluidized bed gasifiers. Likewise, the outlet in such devices may be located near the top wall 164 of the gasifier 106 since the direction of flow is generally upward.

FIGS. 3 through 5 are cross-sectional side views of additional embodiments of the gasifier 106 for use with the IGCC system 100 of FIG. 1. Each of the illustrated views shows a different arrangement of injectors in accordance with embodiments of the present invention. The embodiment illustrated in FIG. 3 includes the first injector 180, the second injector 182, and the third injector 184. As before, the first injection axis 190 is disposed along the longitudinal axis 186 of the gasifier 106 parallel to the axial axis 150. That is, the first injection axis 190 is parallel to the outlet axis 204. In the embodiment illustrated in FIG. 2, the second injection axis 191 and the third injection axis 192 are perpendicular to the first injection axis 190. In contrast, in the embodiment of FIG. 3, the second and third injection axes 191 and 192 are not perpendicular to the first injection axis 190, the outlet axis 204, and the longitudinal axis 186. For instance, the second injection axis 191 is oriented at a first angle 214 relative to a plane 215 perpendicular to the outlet axis 204, the first injection axis 190, and the longitudinal axis 186. That is, the second injection axis 191 is oriented at the angle 214 relative to the plane 215 extending parallel to the radial axis 152. Similarly, the third injection axis 192 is oriented at a second angle 216 relative to the plane 215 extending perpendicular to the outlet axis 204, the first injection axis 190, and the longitudinal axis 186. In some embodiments, the first angle 214, the second angle 216, or both, may range between approximately 5 to 85, to 80, 20 to 70, 30 to 60, 40 to 50, 15 to 60, 15 to 45, or 20 to 40 degrees in upstream directions generally opposite to the downward direction 194 (e.g., downstream flow direction) toward the outlet 187. For example, in one embodiment, the first angle 214 and the second angle 216 may be approximately 30 degrees, such that the second injector 182 and the third injector 184 are oriented in an upstream angled direction. In the illustrated embodiment, the first angle 214 and the second angle 216 are approximately equal. However, in further embodiments, the first angle 214 and the second angle 216 may not be equal. For example, the first angle 214 may be approximately 10 degrees, and the second angle 216 may be approximately 40 degrees, such that fluid flow from the third injector 184 impacts the gasification chamber 178 at a location upstream of where fluid flow from the second injector 182 impacts the chamber 178.

Since the second injection axis 191 is oriented at angle 214, fluid flow emerging from the second injector 182 is directed in a generally angular direction upstream into the gasification chamber 178 during operation. However, fluid flow originating from the second injector 182 may also diverge outward from injection axis 191 (e.g., divergent spray), as indicated by reference numeral 198. Similarly, the third injection axis 192 is directed in a generally angular direction upstream into the gasification chamber 178. Therefore, as before, fluid flow from the third injector 184 is directed in a generally angular direction upstream into the gasification chamber 178, but fluid may also diverge (e.g., divergent spray) as indicated by reference numeral 200. In the illustrated embodiment, since the second injector 182 and the third injector 184 are oriented at approximately the same angle (i.e., first angle 214 is approximately equal to second angle 216), the flow path from the second injector 182 and the flow path from the third injector 184 are directed in generally converging directions. Accordingly, flow from the second injector 182 and flow from the third injector 184 may create turbulence when the two flow paths intersect in the gasification chamber 178. Additional turbulence may be created when fluid flow from the second injector 182 and fluid flow from the third injector 184 converge with fluid flow from the first injector 180. Specifically, fluid flow from the first injector 180 is directed downstream toward the outlet 187, whereas fluid flow from the second and third injectors 182 and 184 is directed upstream away from the outlet 187 in opposing flow with the flow from the first injector 180. Thus, the second and third injectors 182 and 184 inject fluid flow both crosswise relative to the axes 186, 190, and 204, while also opposing fluid flow from the first injector 180. As previously mentioned, such turbulence may enable the gasifier 106 to handle a larger capacity of fuel as compared to traditional single injector gasification systems.

It should be noted that any number of injectors may be included in the gasifier 106 of FIG. 3 in accordance with embodiments of the present invention. For instance, in some embodiments, there may be a plurality of tilted injectors spaced apart from one another about the side wall 168 of the enclosure 156. That is, multiple injectors (e.g., 2 to 100, 5 to 50, or 10 to 25 injectors) may be oriented at angles relative to the plane 215 perpendicular to the outlet axis 204 may be circumferentially offset (e.g., in circumferential direction 154) from one another about the perimeter of the side wall 168. In such embodiments, the angles may be the same or different for each of the plurality of injectors. For example, the angles of the injectors may be arranged such that fluid flow entering the gasification chamber 178 generates an increased amount of turbulence, thereby increasing mixing in the chamber 178.

FIG. 4 is a cross-sectional side view of a further embodiment of the gasifier 106 shown in FIG. 3. As before, the gasifier 106 includes the first injector 180, the second injector 182, and the third injector 184. However, in contrast to the embodiment of FIG. 3, the gasifier 106 of FIG. 4 also includes a fourth injector 226 and a fifth injector 228. The fourth injector 226 and the fifth injector 228 have a fourth injection axis 230 and a fifth injection axis 232 that determine the general orientation of fluid flow originating from the fourth injector 226 and the fifth injector 228, respectively. As previously described, the first injection axis 190 is parallel to the longitudinal axis 186 of the gasifier 106. In this embodiment, the fourth and fifth injection axes 230 and 232 are not perpendicular to the first injection axis 190, the outlet axis 204, and the longitudinal axis 186. For instance, the fourth injection axis 230 is oriented at a third angle 234 relative to the plane 215 perpendicular to the outlet axis 204, the first injection axis 190, and the longitudinal axis 186. Similarly, the fifth injection axis 232 is oriented at a fourth angle 236 relative to the plane 215 perpendicular to the outlet axis 204, the first injection axis 190, and the longitudinal axis 186.

In some embodiments, the third angle 234, the fourth angle 236, or both, may range between approximately 5 to 85, 10 to 80, 20 to 70, 30 to 60, 40 to 50, 15 to 60, 15 to 45, or 20 to 40 degrees in downstream directions generally along the downward direction 194 (e.g., downstream flow direction) toward the outlet 187. For example, in the embodiment illustrated in FIG. 4, the third angle 234 and the fourth angle 236 are approximately 30 degrees, such that the fourth injector 226 and the fifth injector 228 are oriented in a downstream angled direction toward the outlet 187. In further embodiments, the third angle 234 and the fourth angle 236 may not be equal. For example, the third angle 234 may be approximately 20 degrees, and the fourth angle 236 may be approximately 50 degrees, such that fluid flow from the fifth injector 228 impacts the gasification chamber 178 at a location downstream of where fluid flow from the fourth injector 226 impacts the chamber 178. The foregoing features have the effect of directing fluid flow emerging from the fourth injector 226 in a generally downstream direction into the gasification chamber 178 during use. However, fluid flow originating from the fourth injector 226 may also diverge outward (e.g., divergent spray) toward the top wall 164 and the bottom wall 166 as indicated by reference numeral 238. Likewise, fluid flow from the fifth injector 228 is also directed in a generally downstream direction toward outlet 187, but may diverge outward (e.g., divergent spray) during use as indicated by reference numeral 240.

During operation of the gasifier 106, fluid flow injected into the gasification chamber 178 via the first injector 180 flows downstream toward the outlet 187 in direction 194. The flow from the first injector 180 first converges with the flows from the fourth injector 226 and the fifth injector 228 (e.g., crosswise flows), generating turbulence that mixes the fuel and air in the gasifier 106 and increases efficiency of the gasification reactions. As the flow stream progresses further downstream, it converges with the flows from the second injector 182 and the third injector 184 (e.g., crosswise flows), creating further turbulence and more mixing. Accordingly, as the fluid flow moves from the top wall 164 to the outlet 187 of the gasifier 106, the flow rate may be lessoned due to the convergence of multiple crosswise streams, at least some of which are directed upstream against (e.g., opposing) the downstream flow direction 194 toward the outlet 187. This feature may have the effect of increasing the residence time and, therefore, maintaining high carbon conversion rates in the gasifier 106.

In certain embodiments, the injectors 180, 182, 184, 226, and 228 may inject fuel, oxygen (e.g., air), or fuel/oxygen mixtures in different configurations. For example, the first injector 180 may inject oxygen (e.g., air), whereas the second, third, fourth, and fifth injectors 182, 184, 226, and 228 inject fuel, or vice versa. By further example, the first, second, and third injectors 180, 182, and 184 may inject oxygen (e.g., air), whereas the fourth and fifth injectors 226 and 228 inject fuel, or vice versa. By further example, the first, fourth, and fifth injectors 180, 226 and 228 may inject oxygen (e.g., air), whereas the second and third injectors 182 and 184 inject fuel, or vice versa. By further example, the injectors 180, 182, 184, 226, and 228 all may inject a fuel/oxygen mixture of equal or different ratios. However, any suitable configuration of fuel and oxygen injection is within the scope of the disclosed embodiments.

FIG. 5 is a cross-sectional side view of a further embodiment of the gasifier 106 shown in FIG. 3. In this embodiment, there are no injectors located in the top end portion 158 disposed on the top wall 164. Instead, this embodiment only includes side injectors 182 and 184 oriented at upstream angles 214 and 216, respectively. That is, in presently contemplated embodiments, injectors may be exclusively located in the side wall 168 of the gasifier 106. In the illustrated embodiment, two injectors 182 and 184 (or any number of injectors) are spaced apart from one another circumferentially (e.g., spaced in circumferential direction 154) about the side wall 168 of the enclosure 156 at a distance 250 from the outlet 187. In further embodiments, more than two injectors (e.g., approximately 5, 10, 15, or 20 injectors) may be disposed about the circumference of the enclosure 156 at distance 250 from the outlet 187. Additionally, a plurality of injectors may be circumferentially offset from one another at other axial distances (e.g., offset in axial direction 150) from the outlet 187 and/or radial distances (e.g., offset in radial direction 152) from the longitudinal axis 186. That is, one or more annular arranges of injectors may be located at one or more axial, radial locations from the outlet 187 in other embodiments.

Figure 6:
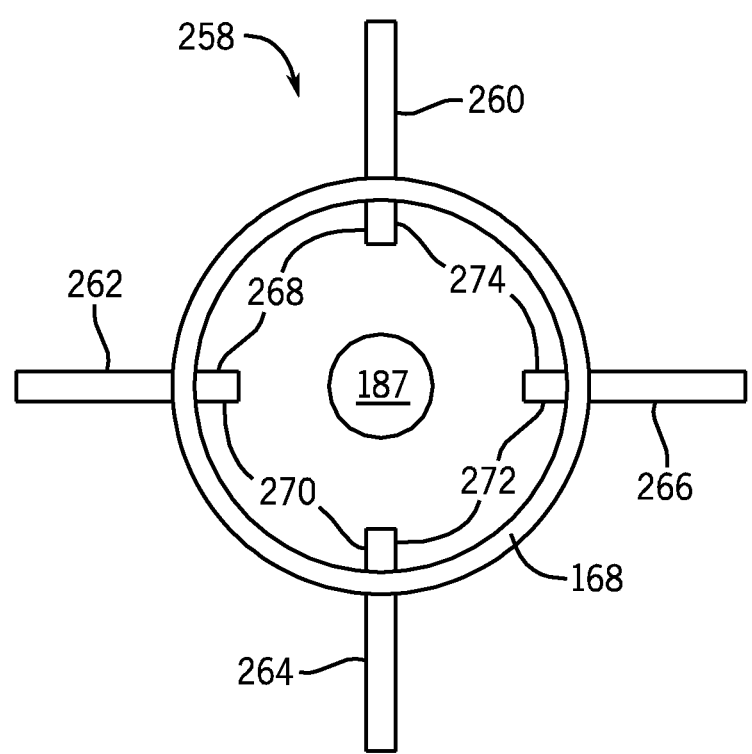
FIG. 6 is a cross-sectional top view of an embodiment of the gasifier of FIG. 1 including a plurality of injectors disposed about a perimeter of a gasification chamber.

FIG. 6 is a cross-sectional top view of an embodiment of the gasifier 106 taken along the plane 215 perpendicular to the longitudinal axis 186 of the gasifier 106. As illustrated in FIG. 6, the gasifier 106 includes an annular array or ring-shaped arrangement of injectors 258 including four injectors, that is, injector 260, injector 262, injector 264, and injector 266. In certain embodiments, the ring-shaped arrangement of injectors 258 may be located at any axial distance (e.g., offset in axial direction 150) from the outlet 187. As shown, injector 260 is circumferentially offset from injector 262 by a distance 268 along the perimeter of side wall 168. Similarly, injector 264 is circumferentially offset from injector 262 by a distance 270, injector 266 is circumferentially offset from injector 264 by a distance 272, and injector 260 is circumferentially offset from injector 266 by a distance 274. It should be noted that any number of injectors could be spaced about the side wall 168 of the gasifier 106 in a similar arrangement. For example, additional injectors could be placed along side wall 168 in between the illustrated injectors 260, 262, 264, and 266. For further example, an injector may be placed between injector 260 and injector 262 at a distance that is approximately 50 percent of distance 268.

As described above, the disclosed embodiments of multiple injectors inject fuel, oxygen, or a combination thereof, into the gasification chamber 178 to increase the mixing, residence time, and uniformity of flow throughout the gasification chamber 178, thereby increasing the performance (e.g., carbon conversion and coal handling capacity) of the gasifier 106. In each of the foregoing embodiments, each illustrated injector may include fuel injection, oxygen injection (e.g., air injection), or a combination thereof. Furthermore, each illustrated injector may include one or more discrete injectors, e.g., 1 to 100, 5 to 50, or 10 to 25. In general, the illustrated injectors include at least one or more injectors oriented crosswise and/or angled upstream relative to the longitudinal axis 186, the axis 190 of the first injector 180, or the axis 204 of the outlet 187. In other words, the illustrated injectors include at least one or more injectors oriented in the radial direction 152, e.g., along or angled relative to the plane 215. For example, the illustrated injectors may include a plurality of sets of injectors, wherein each set of injectors is angled upstream or downstream relative to the plane 215 in crosswise flow relative to the downstream flow direction 194. In this manner, the injectors substantially improve the mixing and residence time of fuel (e.g., carbon feedstock) in the gasifier 106, thereby increasing carbon conversion efficiency and output of the gasifier 106.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a gasifier, comprising:
an enclosure disposed about a gasification chamber, wherein the enclosure comprises a top wall, a bottom wall, and a side wall between the top and bottom walls; a gasification chamber outlet disposed in the bottom wall;
a first injector disposed in the top wall, wherein the first injector has a first injection outlet;
a second injector disposed in the side wall about the gasification chamber, wherein the second injector has a second injection outlet disposed downstream of the first injection outlet and upstream of the gasification chamber outlet, wherein each of the first and second injectors are operatively connected to a fuel source, an oxygen source, or both, and are configured to inject fuel, oxygen, or a combination thereof, into the gasification chamber; wherein the second injector is oriented in an upstream direction generally away from the gasification chamber outlet and toward the first injector; and a third injector oriented in a downstream direction generally toward the gasification chamber outlet and away from the first injector, wherein the third injector is disposed in the side wall about the gasification chamber, and the third injector has a third injection outlet disposed downstream of the first injection outlet and upstream of the second injection outlet.

2. The system of claim 1, wherein the first injector comprises a first injection axis, the second injector comprises a second injection axis, and the gasification chamber outlet comprises an outlet axis, wherein the second axis is not perpendicular to the first injection axis, the outlet axis, or both.

3. The system of claim 2, wherein the first injection axis is parallel to the outlet axis.

4. The system of claim 2, wherein the second injection axis is oriented at an angle relative to a plane perpendicular to the first injection axis, and the angle ranges between approximately 5 to approximately 80 degrees.

5. The system of claim 2, wherein the second injection axis is oriented at an angle relative to a plane perpendicular to the first injection axis, and the angle ranges between approximately 15 to approximately 60 degrees.

6. The system of claim 1, wherein the second injector comprises a plurality of side injectors circumferentially spaced apart from one another about a perimeter of the side wall.

7. The system of claim 6, wherein the plurality of side injectors comprise a first pair of injectors diametrically opposite from one another, and the plurality of side injectors further comprise a second pair of injectors diametrically opposite from one another, wherein the first and second pairs of injectors are circumferentially offset from one another about the perimeter of the side wall.

8. A system, comprising:
a gasifier, comprising:
an enclosure disposed about a gasification chamber;
a gasification chamber outlet coupled to the enclosure, wherein the gasification chamber outlet comprises an outlet axis for exhaust in a downstream direction; and
a first injector disposed in a side wall of the enclosure about the gasification chamber and upstream of the gasification chamber outlet, wherein the first injector operatively connects to a fuel source, an oxygen source, or both, wherein the first injector comprises a first injection axis for injection of fuel, oxygen, or a combination thereof into the gasification chamber, the first injection axis is not perpendicular to the outlet axis, and the first injector is oriented in an upstream direction away from the gasification chamber outlet and toward a second injector positioned in the top wall of the enclosure; a third injector oriented in a downstream direction generally toward the gasification chamber outlet and away from the second injector, wherein the third injector is disposed in the side wall about the gasification chamber, and the third injector has a third injection outlet disposed downstream of the second injection outlet and upstream of the first injection outlet.

9. The system of claim 8, wherein the first injection axis is oriented at an angle relative to a plane perpendicular to the outlet axis, and the angle ranges between approximately 15 to approximately 60 degrees.

10. The system of claim 8, wherein the first injector comprises a plurality of side injectors circumferentially spaced apart from one another about a side wall of the enclosure.

11. The system of claim 10, wherein the plurality of side injectors comprise a first pair of injectors diametrically opposite from one another.

12. The system of claim 8, wherein the second injector comprises a second injection axis aligned with the outlet axis.

13. The system of claim 8, wherein the second injector comprises a second injection axis, the first injection axis is oriented at a first angle relative to a plane perpendicular to the outlet axis, the second injection axis is oriented at a second angle relative to the plane, the first angle is oriented in the upstream direction, and the second angle is oriented in the downstream direction.

14. A system, comprising:
a gasifier, comprising:
an elongated enclosure disposed about a gasification chamber, wherein the elongated enclosure comprises a first end portion, a second end portion opposite from the first end portion, and an intermediate portion between the first and second end portions;
a first injector coupled to the first end portion about the gasification chamber;
a second injector coupled to the intermediate portion about the gasification chamber and upstream of a gasification chamber outlet disposed in the second end portion; a gasification chamber outlet coupled to the second end portion, wherein the gasification chamber outlet is longitudinally offset from the first injector by a first distance, the second injector is longitudinally offset from the first injector by a second distance, and the second distance is approximately 50 to approximately 75 percent of the first distance;
wherein the second injector is oriented in an upstream direction generally away from the gasification chamber outlet and toward the first injector, and a third injector oriented in a downstream direction generally toward the gasification chamber outlet and away from the first injector, wherein the third injector is disposed in the side wall about the gasification chamber, and the third injector has a third injection outlet disposed downstream of the first injection outlet and upstream of the second injection outlet.

15. The system of claim 14, wherein the first and second injectors comprise fuel injectors, oxygen injectors, or fuel/oxygen injectors.

16. The system of claim 14, wherein the first injector comprises a first plurality of injectors, and the second injector comprise a second plurality of injectors.

* * * * *